US008565348B2

(12) United States Patent
Tsunoda et al.

(10) Patent No.: US 8,565,348 B2
(45) Date of Patent: Oct. 22, 2013

(54) RADIO TRANSMITTING APPARATUS

(75) Inventors: Keiji Tsunoda, Yokohama (JP); Hideaki Majima, Tokyo (JP); Hiroyuki Fujiki, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/409,452

(22) Filed: Mar. 1, 2012

(65) Prior Publication Data

US 2013/0028350 A1 Jan. 31, 2013

(30) Foreign Application Priority Data

Jul. 29, 2011 (JP) ................................. 2011-166981

(51) Int. Cl.
*H04L 27/20* (2006.01)
(52) U.S. Cl.
USPC ........... 375/308; 375/271; 375/272; 375/273; 375/279; 375/283; 375/302; 375/303; 375/307; 455/108; 329/300; 329/315
(58) Field of Classification Search
USPC ......... 375/271, 272, 273, 279, 283, 302, 303, 375/308; 455/108; 329/300, 315
See application file for complete search history.

(56) References Cited

U.S. PATENT DOCUMENTS

2009/0129503 A1\* 5/2009 Sagara ......................... 375/302

FOREIGN PATENT DOCUMENTS

JP 2001-285378 10/2001

OTHER PUBLICATIONS

"Radio Specification", Bluetooth Core Specification Version 4.0, Bluetooth Special Interest Group, Jun. 30, 2010, vol. 2 Part A, 30 pages.
"Baseband Specification", Bluetooth Core Specification Version 4.0, Bluetooth Special Interest Group, Jun. 30, 2010, vol. 2 Part B, 148 pages.

\* cited by examiner

*Primary Examiner* — Leon Flores
(74) *Attorney, Agent, or Firm* — Oblon, Spivak, McClelland, Maier & Neustadt, L.L.P.

(57) ABSTRACT

The radio transmitting apparatus includes a first initial phase value setting circuit that sets, in the first modulator, an initial value of the phase of the first modulated signal, which is a value at the start of the modulation according to the first modulation scheme. The radio transmitting apparatus includes a second initial phase value setting circuit that sets, in the second modulator, the phase stored in the phase storing circuit as an initial value of the phase of the second modulated signal, which is a value at the start of the modulation according to the second modulation scheme. The radio transmitting apparatus includes a signal gathering circuit that selects and outputs the first modulated signal output from the first modulator and then selects and outputs the second modulated signal output from the second modulator.

18 Claims, 15 Drawing Sheets

CASE WHERE INPUT SYMBOL IS "1"

CASE WHERE INPUT SYMBOL IS "0"

PHASE AFTER TRANSMISSION OF NEXT SYMBOL IN
THE CASE WHERE CURRENT PHASE IS 0 DEGREES

PHASE AFTER TRANSMISSION OF NEXT SYMBOL IN
THE CASE WHERE CURRENT PHASE IS $\pi/4$

RADIO TRANSMITTING APPARATUS

CROSS-REFERENCE TO RELATED APPLICATION

This application is based upon and claims the benefit of priority from the prior Japanese Patent Application No. 2011-166981, filed on Jul. 29, 2011, the entire contents of which are incorporated herein by reference.

BACKGROUND

1. Field

Embodiments described herein relate generally to a radio transmitting apparatus.

2. Background Art

Recently, more radio communication systems are capable of communication using a plurality of modulation schemes in one transmission frame or packet.

Provided that the plurality of modulation schemes are a first modulation scheme and a second modulation scheme, the modulation process is discontinuous when switching from the first modulation scheme to the second modulation scheme occurs.

There is a problem that meeting the radio transmission rules concerning the first modulator and the second modulator does not mean that the rules are met during the switching.

DETAILED DESCRIPTION

Figure 1:
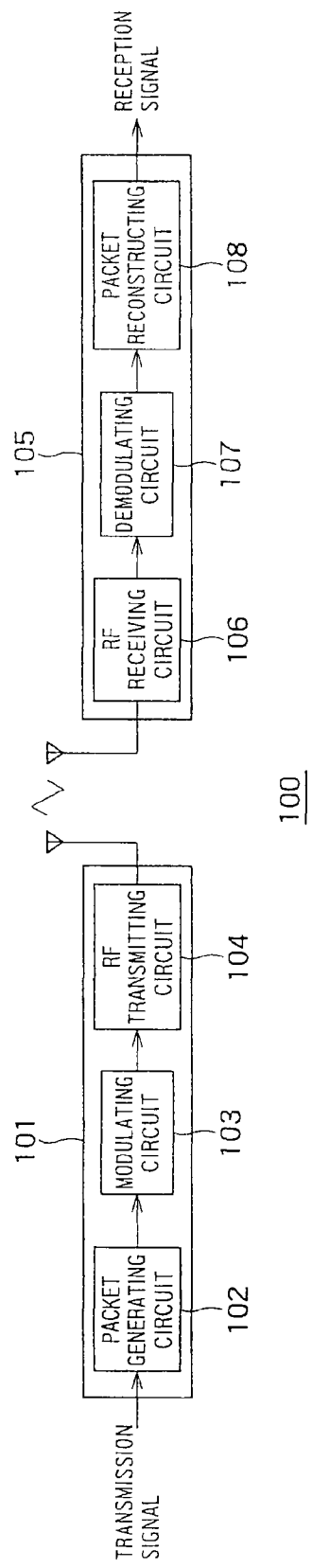
FIG. 1 is a block diagram showing an example of a configuration of a radio communication system 100 according to a first embodiment.

A radio transmitting apparatus according to an embodiment performs modulation of an input packet signal according to at least two modulation schemes. The radio transmitting apparatus includes a signal routing circuit that routes the input packet signal. The radio transmitting apparatus includes a first modulator that performs modulation of the packet signal routed from the signal routing circuit according to a first modulation scheme and outputs a resulting first modulated signal. The radio transmitting apparatus includes a second modulator that performs modulation of the packet signal routed from the signal routing circuit according to a second modulation scheme and outputs a resulting second modulated signal. The radio transmitting apparatus includes a first initial phase value setting circuit that sets, in the first modulator, an initial value of the phase of the first modulated signal, which is a value at the start of the modulation according to the first modulation scheme. The radio transmitting apparatus includes a phase storing circuit that stores the phase of the first modulated signal at the end of the modulation of the packet signal by the first modulator. The radio transmitting apparatus includes a second initial phase value setting circuit that sets, in the second modulator, the phase stored in the phase storing circuit as an initial value of the phase of the second modulated signal, which is a value at the start of the modulation according to the second modulation scheme. The radio transmitting apparatus includes a signal gathering circuit that selects and outputs the first modulated signal output from the first modulator and then selects and outputs the second modulated signal output from the second modulator.

Recently, more radio communication systems are capable of communication using a plurality of modulation schemes in one transmission frame or packet.

The plurality of modulation schemes is a combination of frequency shift keying (FSK) and phase shift keying (PSK) or a combination of four-value PSK and eight-value PSK, for example. This is based on consideration of the following two points.

A first of the points is the tradeoff between reception quality and transfer rate.

In radio communication, information is exchanged in units of frames or packets. The frame synchronizing capability that enables proper reception of frames or packets is particularly important in reception. If frame synchronization is lost, a packet or frame has to be retransmitted, or data exchange does not occur, and the communication is not established.

For this reason, in general, the part of a packet or frame that is allocated for frame synchronization is often modulated by a simpler modulation scheme and transmitted at lower transmission rate in order to facilitate synchronization.

On the other hand, for the payload part of the packet or frame that carries information, priority is given to the efficiency of use of the limited radio resource. Therefore, for the payload part, many radio communication systems adopt modulation schemes that permit them to deliver their best communication performance.

Thus, different modulation schemes are used for the frame synchronizing part and the payload part.

A second point is expansion of traditional communication systems.

There are some long-standing radio systems that adopt a newly developed innovative modulation scheme with higher data transmission efficiency for the payload part of the packet or frame.

However, those systems have to use the traditional radio system format for the leading part of the packet or frame to specify the modulation scheme used for the subsequent payload part in order to maintain the compatibility with the traditional radio systems. For example, a radio local area network (LAN) is such a system.

In transmission, a radio system has to comply with the rules concerning the maximum value of the transmission radio power at a certain frequency, the level of interference with other frequencies and the like. The rules include the radio law or other laws concerning radio waves in the relevant countries and the rules specific to the radio system. In the following, the rules will be referred to as radio transmission rules.

In general, a designer of a radio system capable of using a plurality of modulation schemes for packet or frame transmission designs each modulator to meet the radio transmission rules concerning the corresponding modulation scheme.

For example, consider a radio transmitting apparatus in a radio system that transmits packets. The radio transmitting apparatus includes a first modulator that performs modulation according to a first modulation scheme and a second modulator that performs modulation according to a second modulation scheme.

When the first modulator completes a first packet transmission, the second modulator starts a second packet transmission. In the period in which the transmission is performed using the modulation according to the first modulation scheme and the period in which the transmission is performed using the modulation according to the second modulation scheme, the radio transmission rules are met.

The modulation process is discontinuous during switching from the first modulation scheme to the second modulation scheme. However, the radio transmission rules also have to be met in this period.

There is a problem that meeting the radio transmission rules concerning the first modulator and the second modulator does not mean that the rules are met during the switching.

As described above, in radio transmission using a plurality of modulation schemes in one frame or packet, the radio transmission rules have to be met during switching between the modulation schemes However, optimizing each modulation scheme does not suffice to meet the rules during the switching.

Therefore, there is a need for a mechanism that conducts arbitration between the modulators that perform modulation according to the respective modulation schemes.

In view of such circumstances, radio transmitting apparatuses capable of more properly switching between modulation schemes while meeting the required rules will be proposed in the following description of embodiments.

In the following, the embodiments will be described with reference to the drawings.

(First Embodiment)

FIG. 1 is a block diagram showing an example of a configuration of a radio communication system 100 according to a first embodiment.

As shown in FIG. 1, the radio communication system 100 includes a radio transmitting apparatus 101 and a radio receiving apparatus 105.

The radio transmitting apparatus 101 performs modulation of an input packet signal according to at least two modulation schemes.

The radio transmitting apparatus 101 includes a packet generating circuit 102, a modulating circuit 103, and an RF transmitting circuit 104.

The packet generating circuit 102 is configured to receive a transmission signal, generate a packet signal from the transmission signal and output the packet signal.

The modulating circuit 103 is configured to perform modulation of the input packet signal according to at least two modulation schemes.

The RF transmitting circuit 104 is configured to transmit the modulated signal output from the modulating circuit 103 on a carrier.

That is, the radio transmitting apparatus 101 generates a packet structure by the packet generating circuit 102 inserting a signal to be transmitted into a payload of a packet.

The generated packet is modulated by the modulating circuit 103. Note that the modulating circuit 103 according to this embodiment performs a digital modulation. The signal modulated by the modulating circuit 103 is converted into an analog signal, and then, the radio frequency (RF) transmitting circuit 104 transmits the analog signal on the carrier as a radio wave.

As shown in FIG. 1, the radio receiving apparatus 105 includes an RF receiving circuit 106, a demodulating circuit 107 and a packet reconstructing circuit 108.

The radio receiving apparatus 105 receives the radio wave transmitted from the radio transmitting apparatus 101. The RF receiving circuit 106 reduces the received radio wave to a baseband signal and then converts the baseband signal into a digital signal. The digital signal is demodulated by the demodulating circuit 107 to reconstruct the form of the digital bit signal.

Then, the packet reconstructing circuit 108 reconstructs the packet structure of the reconstructed signal. Then, the reception signal is extracted from the reconstructed packet payload.

Figure 2:
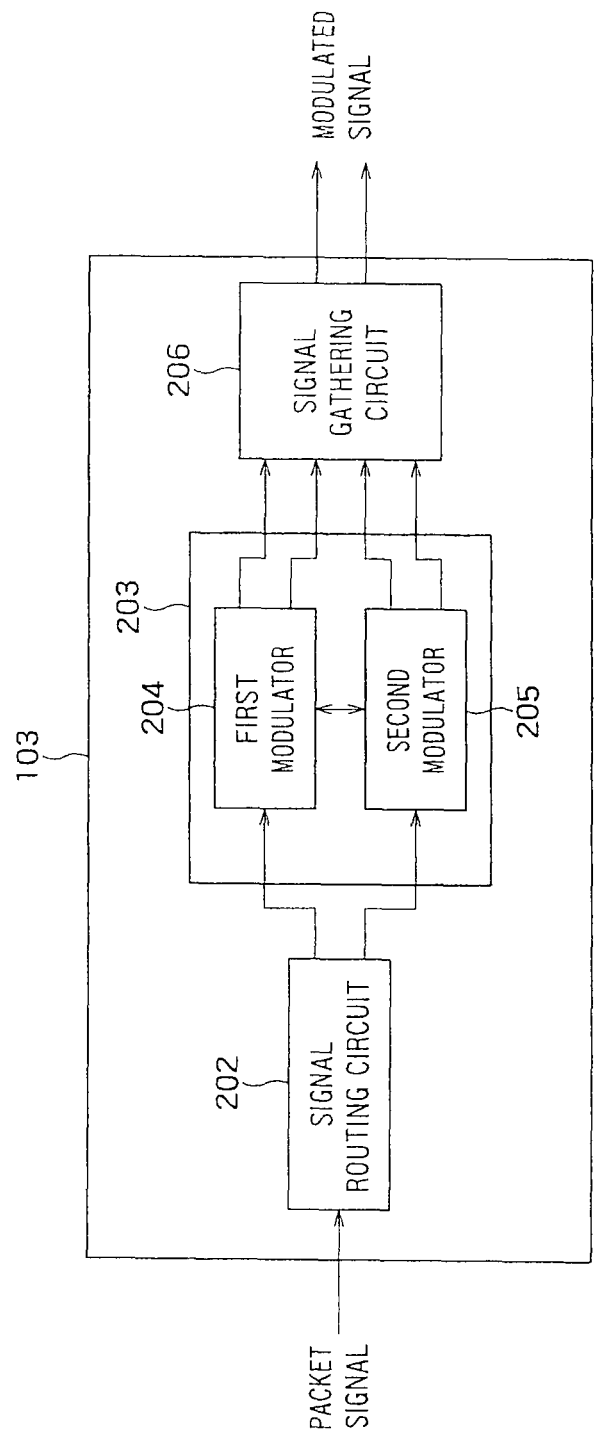
FIG. 2 is a block diagram showing an example of a configuration of the modulating circuit 103 shown in FIG. 1.

FIG. 2 is a block diagram showing an example of a configuration of the modulating circuit 103 shown in FIG. 1.

As shown in FIG. 2, the modulating circuit 103 includes a signal routing circuit 202, a modulation controlling circuit 203 and a signal gathering circuit 206.

The modulation controlling circuit 203 includes at least a first modulator 204 and a second modulator 205.

When the packet signal is input to the modulating circuit 103, the signal routing circuit 202 first routes the signal to the first modulator 204.

The first modulator 204 modulates the input signal according to a first modulation scheme and outputs the resulting modulated signal.

The output modulated signal contains information on amplitude and phase (polar coordinates). In general, the modulating circuit 103 outputs a signal in a Cartesian coordinate system having an in-phase (I) component and a quadrature (Q) component as information responsive to the RF signal.

The signal gathering circuit 206 selects the signal output from the first modulator 204 and outputs the selected signal.

When a certain symbol in the packet signal input to the modulating circuit 103 is reached, the signal routing circuit 202 switches to route the signal to the second modulator 205.

The second modulator 205 modulates the input signal according to a second modulation scheme and outputs the resulting modulated signal as a signal in the Cartesian coordinate system.

Then, the signal gathering circuit 206 selects the signal output from the second modulator 205 and outputs the selected signal.

In this way, the time of switching of the route of the packet signal by the signal routing circuit 202 and the time of switching of the selection by the signal gathering circuit 206 depend on the packet structure.

Figure 3:
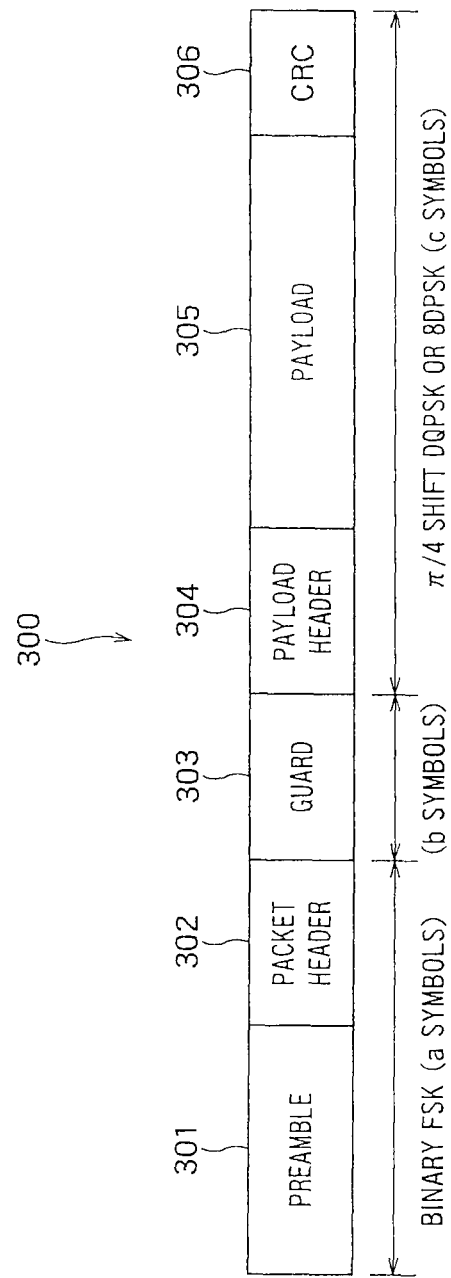
FIG. 3 is a diagram showing an example of a configuration of the received packet signal.

FIG. 3 is a diagram showing an example of a configuration of the received packet signal.

As shown in FIG. 3, the packet signal includes a preamble 301, a packet header 302 following the preamble 301, a guard section 303 following the packet header 302, a payload header 304 following the guard section 303, a payload 305 following the payload header 304, and a cyclic redundancy check (CRC) 306.

The preamble 301 is information required for packet synchronization on the receiving side.

The packet header 302 includes information such as type and address of the packet signal.

The guard section 303 is provided between sections in which two different modulation schemes described later are applied and responsible for connecting the sections to each other.

The payload header 304 functions as a synchronizing signal used for grasping the accurate location of the payload for the modulation scheme.

The payload 305 is the input transmission data. This means that the payload 305 varies in length with the data amount. The other sections than the payload 305 have fixed lengths because they have fixed contents.

The CRC 306 is a redundancy symbol used for detecting a transmission error in the whole of the packet.

The preamble 301, the packet header 302 and the guard section 303 are modulated by binary FSK, which is the first modulation scheme. The total length of the preamble 301 and the packet header 302 is "a" symbols ("a" represents a positive integer). The length of the guard section 303 is "b" symbols ("b" represents a positive integer).

The payload header 304, the payload 305 and the CRC 306 are modulated by π/4 shift differential quadrature PSK (DQPSK) or 8 differential phase shift keying (DPSK), which is the second modulation scheme. The total length of the payload header 304, the payload 305 and the CRC 306 is "c" symbols ("c" represents a positive integer).

Therefore, the signal routing circuit 202 routes to the first modulator 204 the part of the input packet signal from the leading edge of the packet signal to the trailing edge of the guard section 303 shown in FIG. 3, that is, from the leading edge to the (a+b)-th symbol of the packet signal.

On the other hand, the signal routing circuit 202 routes to the second modulator 205 the part of the packet signal from the leading edge of the payload header 304 to the trailing edge of the packet signal.

The signal gathering circuit 206 switches to receive the modulated signal output from the second modulator 205 when output of the modulated signal for the relevant packet signal from the first modulator 204 is completed.

The processing delays of the first modulator 204 and the second modulator 205 are made equal to each other, thereby allowing the modulating circuit 103 to continuously output the modulated signal to the RF transmitting circuit 104.

Now, the amplitude and the angle described above will be discussed. In modulation, the information on amplitude and phase is important as described above. The information is expressed by polar coordinates.

Figure 4:
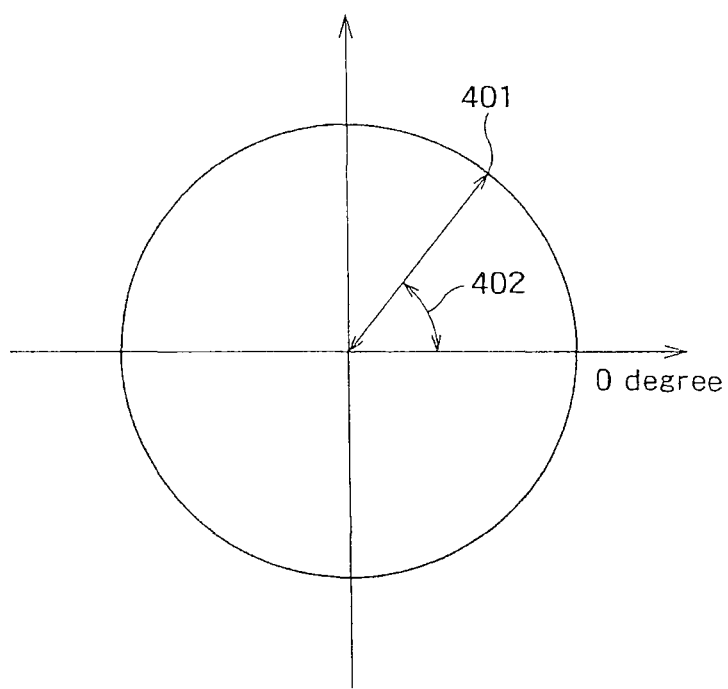
FIG. 4 is a diagram showing an example of polar coordinates.

FIG. 4 shows an example of polar coordinates. In FIG. 4, the length of the arrow represents an amplitude 401, and the angle of the arrow with respect to 0 degrees represents a phase 402.

In the following, the first modulator 204 will be described on the assumption that the first modulation scheme is binary FSK, for example.

Figure 5:
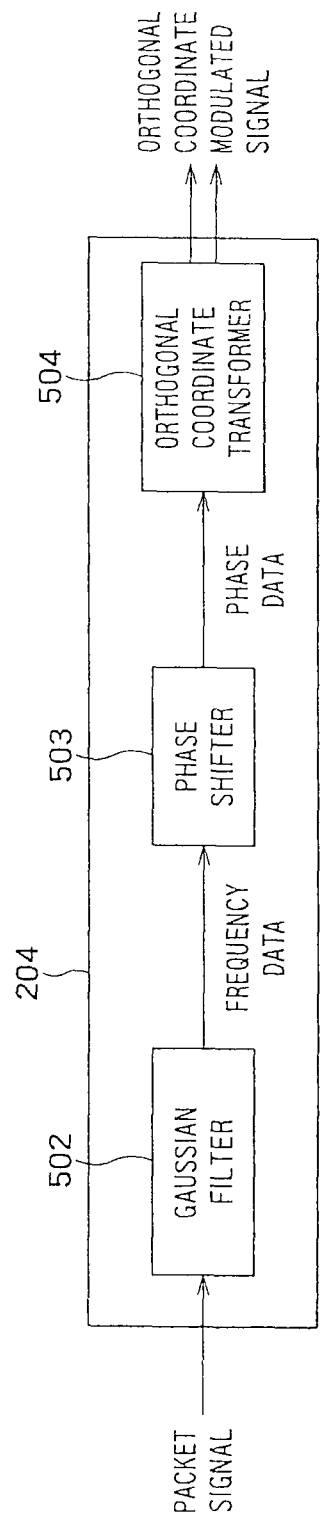
FIG. 5 is a diagram showing an example of a configuration of the first modulator 204 to which the first modulation scheme is applied.

FIG. 5 is a diagram showing an example of a configuration of the first modulator 204 to which the first modulation scheme is applied.

As shown in FIG. 5, the first modulator 204 includes a Gaussian filter 502, a phase shifter 503 and an orthogonal coordinate transformer 504.

A binary packet signal composed of values "0" and "1" is input to the first modulator 204.

The packet signal is first input to the Gaussian filter 502. The Gaussian filter 502 performs oversampling of the input signal and performs frequency sampling in a positive direction if the symbol value is "1" or performs frequency sampling in a negative direction is the symbol value is "0".

The Gaussian filter 502 outputs frequency data based on binary FSK.

Then, the frequency data is input to the phase shifter 503.

Phase data is represented by an integral of the frequency data. Provided that the transmission duration of one symbol is represented by "T", frequency data f(n) is expressed by the following formula (1). In the formula (1), "n" represents a symbol value, and phase data θ(n) indicates the phase for a symbol value "n".

$$f(n) = (\theta(n) - \theta(n-1))/T \quad (1)$$

Figure 6:
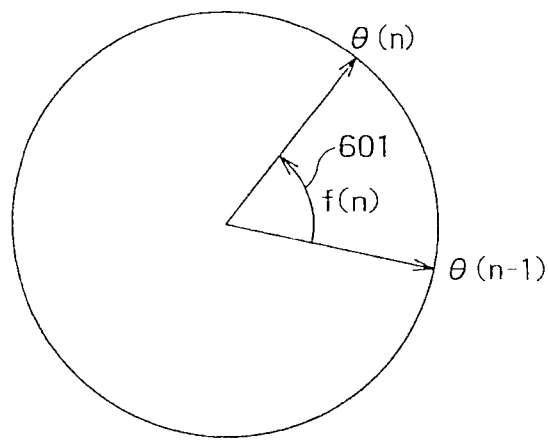
FIG. 6 is a conceptual diagram showing the frequency for an input symbol value "1"
Figure 7:
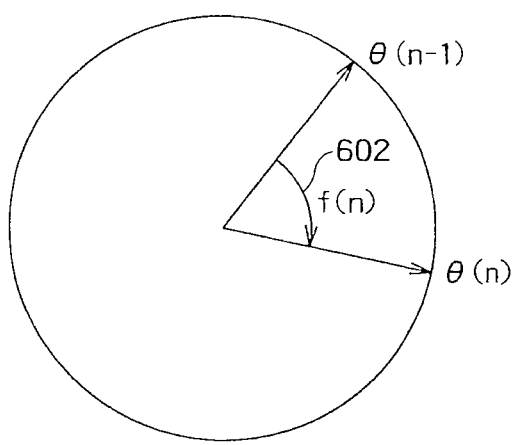
FIG. 7 is a conceptual diagram showing the frequency for an input symbol value "0"

FIG. 6 is a conceptual diagram showing the frequency for an input symbol value "1". FIG. 7 is a conceptual diagram showing the frequency for an input symbol value "0".

As shown in FIG. 6, when the symbol of the packet signal is '1', the phase θ(n) shifts from θ(n−1) by f(n) in the positive direction.

On the other hand, as shown in FIG. 7, when the symbol of the packet signal is '0', the phase θ(n) shifts from θ(n−1) by f(n) in the negative direction.

That is, the formula (1) described above can be transformed into the following formula (2) that expresses the phase data θ(n).

$$\theta(n) = \theta(n-1) + f(n)T$$

$$\theta(n) = T\Sigma f(k) \; (k=0 \; to \; n) \quad (2)$$

According to the relationship expressed by the formula (2), the phase shifter 503 outputs the phase data.

The orthogonal coordinate transformer 504 transforms the input phase data into an orthogonal coordinate system and outputs the resulting signal as the modulated signal.

In the following, the second modulator 205 will be described on the assumption that the second modulation scheme is π/4 shift DQPSK or eight-value DPSK, for example.

Figure 8:
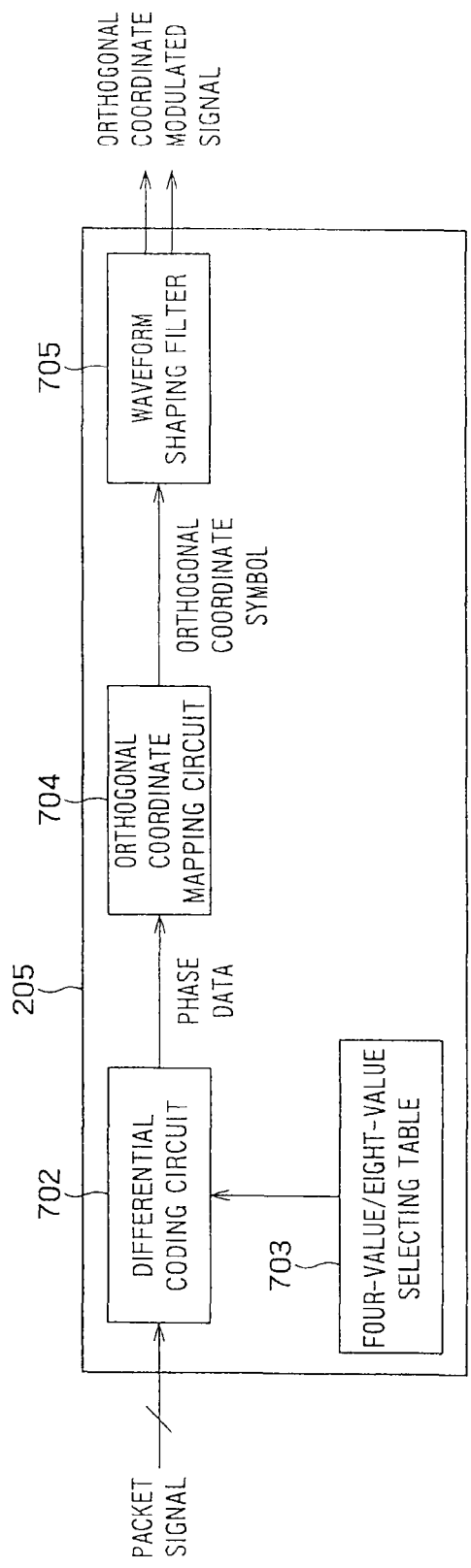
FIG. 8 is a diagram showing an example of a configuration of the second modulator 205 to which the second modulation scheme is applied.

FIG. 8 is a diagram showing an example of a configuration of the second modulator 205 to which the second modulation scheme is applied.

As shown in FIG. 8, the second modulator 205 includes differential coding circuit 702, a four-value/eight-value selecting table 703, an orthogonal coordinate mapping circuit 704, and a waveform shaping filter 705.

In the case of the π/4 shift DQPSK, any of packet signals '00', '01', '10' and '11' is input to the second modulator 205.

In the case of the eight-value DPSK, any of packet signals '000', '001', '010', '011', '100', '101', '110' and '111' is input to the second modulator 205.

The packet signal input to the second modulator 205 enters the differential coding circuit 702 to take a symbol difference in this embodiment.

The differential coding part 702 performs coding using a coding table read from the four-value/eight-value selecting table 703 according to whether the modulation target is four-value or eight-value. Information output from the differential coding part 702 is in a one-to-one relationship with the phase data.

The phase data information is input to the orthogonal coordinate mapping circuit 704, and the orthogonal coordinate mapping circuit 704 transforms the angle data into orthogonal coordinate data. Since there are up to eight kinds of phase data, there are eight kinds of orthogonal coordinates.

Then, the orthogonal coordinate data is input to the waveform shaping filter 705, and the waveform shaping filter 705 generates a digital waveform by oversampling and outputs the digital waveform as a modulated signal in the orthogonal coordinate system.

Now, phase transition by the second modulator 205 will be described.

Figure 9:
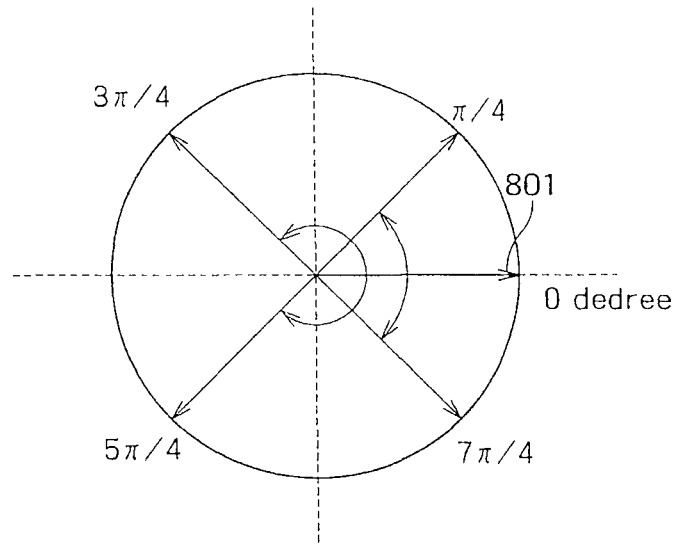
FIG. 9 is a diagram showing an example of phase transition from a current phase of 0 degrees in a polar coordinate system in the case where the second modulation scheme is $\pi/4$ shift DQPSK.

FIG. 9 is a diagram showing an example of phase transition from a current phase of 0 degrees in a polar coordinate system in the case where the second modulation scheme is π/4 shift DQPSK.

Figure 10:
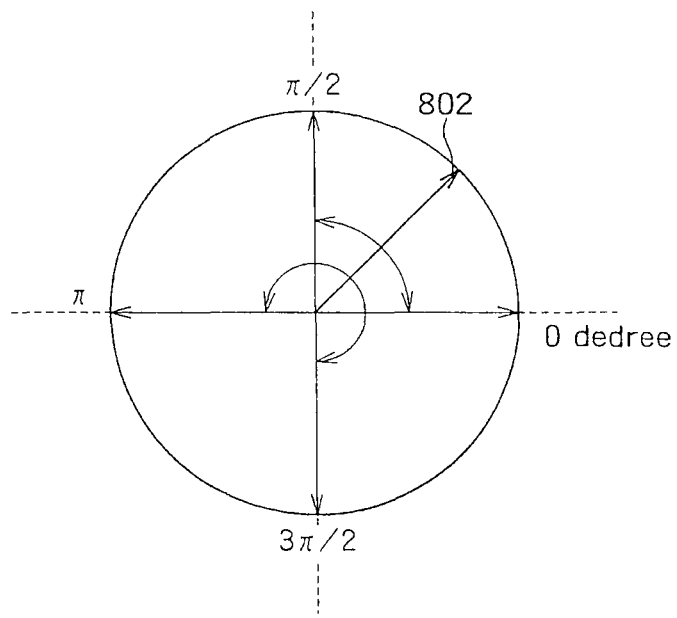
FIG. 10 is a diagram showing an example of phase transition from a current phase of $\pi/4$ degrees in a polar coordinate system in the case where the second modulation scheme is $\pi/4$ shift DQPSK.

FIG. 10 is a diagram showing an example of phase transition from a current phase of π/4 degrees in a polar coordinate system in the case where the second modulation scheme is π/4 shift DQPSK.

As shown in FIG. 9, for example, when a current phase signal 801 indicates a phase of 0 degrees, the phase after the next symbol is transmitted can be any of four phases: π/4, 3π/4, 5π/4 and 7π/4.

As shown in FIG. 10, for example, when a current phase signal 802 indicates a phase of π/4, the phase after the next symbol is transmitted can be any of four phases: 0, π/2, π and 3π/2.

As can be seen from the above description, there are eight possible phases spaced apart from each other by π/4 in transmission.

Figure 11:
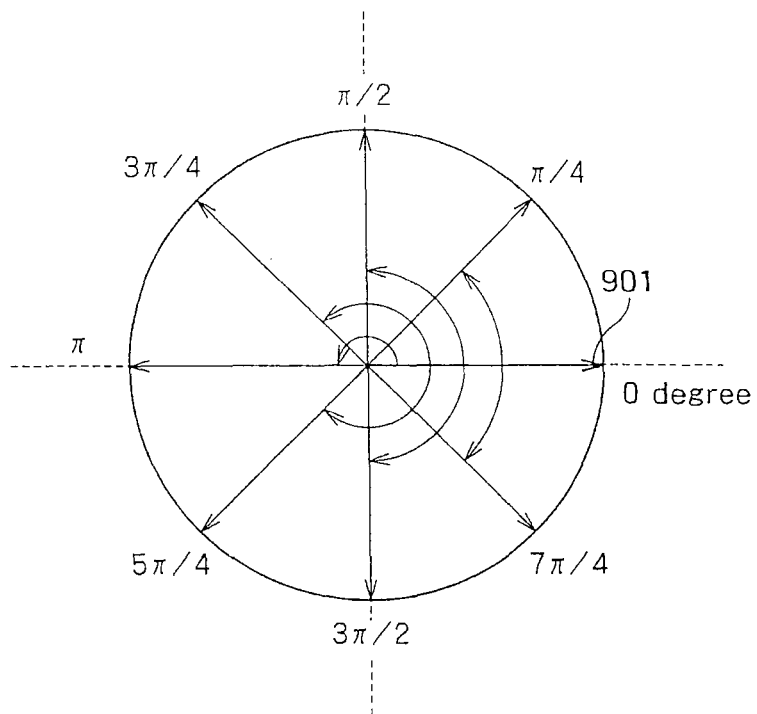
FIG. 11 is a diagram showing an example of phase transition from a current phase of 0 degrees in a polar coordinate system in the case where the second modulation scheme is eight-value DPSK.

FIG. 11 is a diagram showing an example of phase transition from a current phase of 0 degrees in a polar coordinate system in the case where the second modulation scheme is eight-value DPSK.

As shown in FIG. 11, when a current phase signal 901 indicates a phase of 0 degrees, the phase after the next symbol is transmitted can be any of eight phases spaced apart from each other by π/4.

As can be seen from the above description, the possible phases in transmission are the same regardless of whether the second modulation scheme is π/4 shift DQPSK or eight-value DPSK.

Next, a problem of a modulating circuit of a radio transmitting apparatus according to a comparative example will be described.

Figure 12:
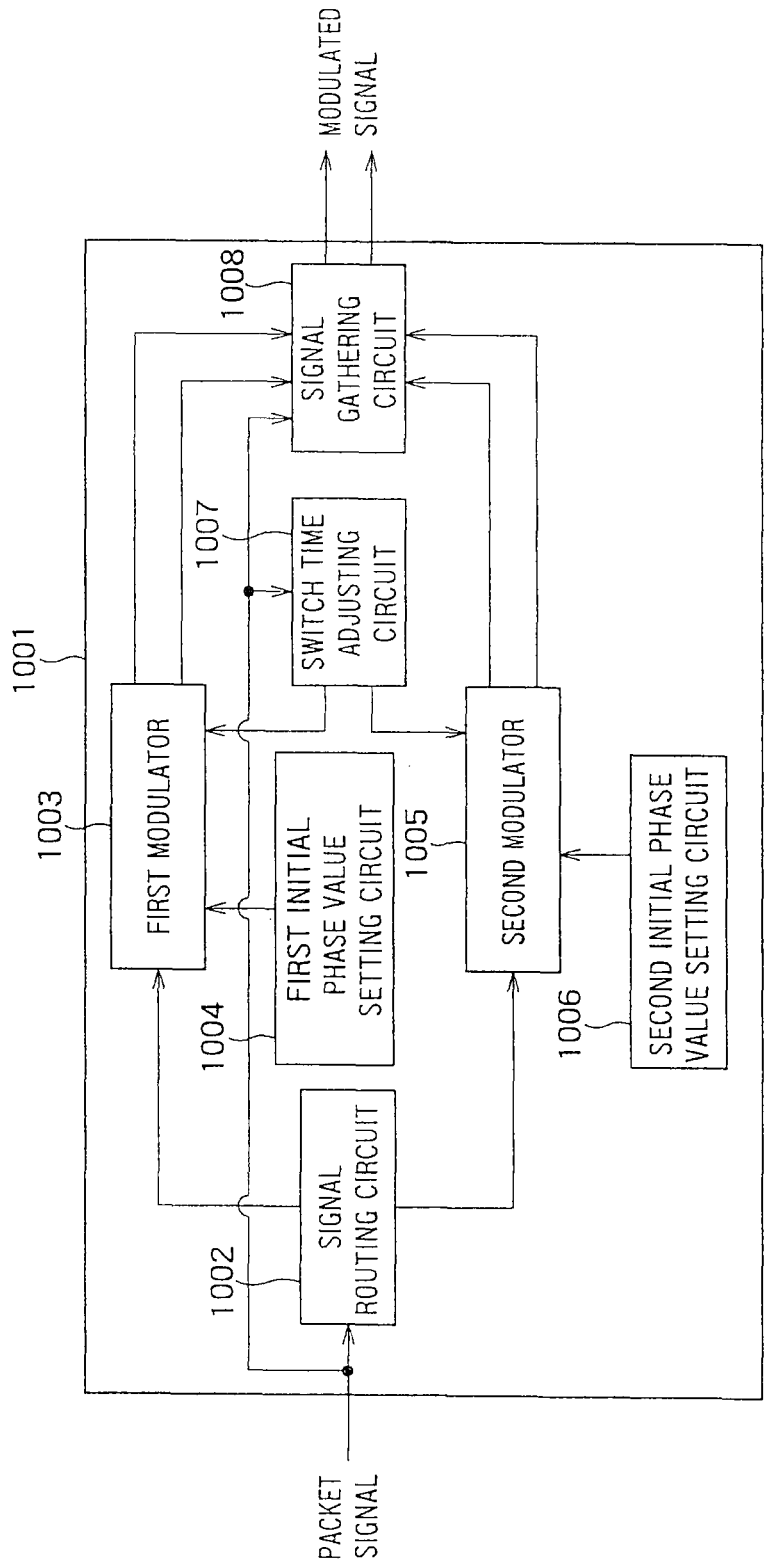
FIG. 12 is a block diagram showing a configuration of a modulating circuit 1001 according to a comparative example.

FIG. 12 is a block diagram showing a configuration of a modulating circuit 1001 according to a comparative example.

As shown in FIG. 12, a first modulator 1003 uses FSK as the first modulation scheme. A second modulator 1005 uses π/4 shift DPSK or eight-value DPSK as the second modulation scheme.

In this comparative example, the initial phase at the time when the modulating circuit 1001 starts modulation is not specified or fixed (at a phase of 0 degrees, for example).

In the case where the modulating circuit 1001 in the comparative example is used to modulate a packet, the modulation starts with a signal routing part 1002 inputting the leading edge of the packet to a first modulator 1003.

Once a first initial phase value setting circuit 1004 sets the initial phase associated with the first modulator 1003 at an initial value "PA", the phase changes from the initial value "PA" according to the input symbol signal. In this period, a signal gathering circuit 1008 selects the data output from the first modulator 1003 and outputs the data as the output of the modulating circuit 1001.

When the last symbol in the packet header 302, shown in FIG. 3, of the signal input to the first modulator 1003 is reached, for example, the first modulator 1003 stops the modulation. The phase of the signal from the first modulator 1003 at this point is represented by "PB". In the period of the guard section 303 shown in FIG. 3, both the first modulator 1003 and a second modulator 1005 do not perform the modulations. This control is achieved by a switch time adjusting circuit 1007 that keeps track of what part of the packet is being input and issues instructions to the modulators based on the part.

When the period of the guard section 303 expires, the signal routing part 1002 starts inputting the packet symbols to the second modulator 1005, and the second modulation starts. At this point, the second modulator 1005 starts the modulation from an initial phase "PC" set by a second initial phase value setting circuit 1006.

At the same time, the signal gathering circuit 1008 switches to select the output from the second modulator 1005 as the output of the modulating circuit 1001.

The three kinds of information expressed by the values (phases) "PA", "PB" and "PC" described above do not always agree with each other. The values "PA" and "PB" depend on the phase difference in FSK. However, the values "PB" and "PC" are completely independent from each other.

For example, it is assumed that the phase changes in steps of π/3 in FSK. When the initial phase "PA" in FSK is 0 degrees, the value "PB" can be any of six phases/0, π/3, 2π/3, π, 4π/3 and 5π/3.

Figure 13:
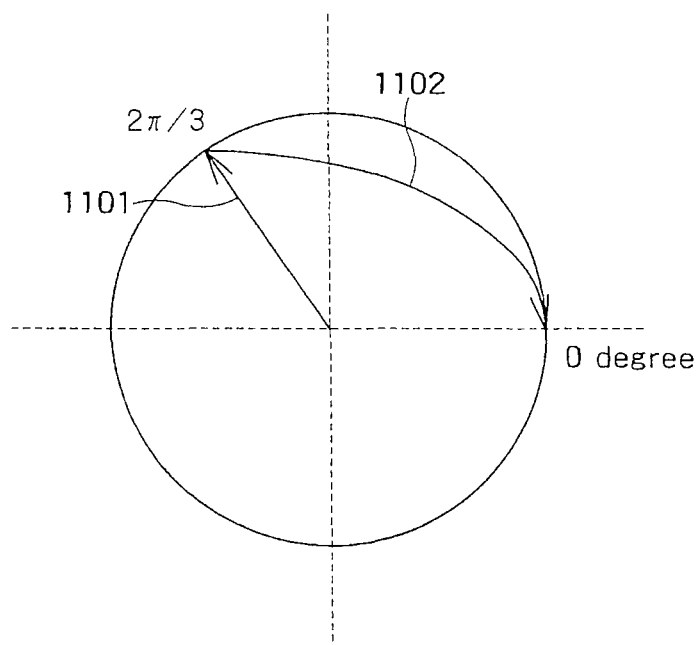
FIG. 13 is a diagram showing polar coordinates that show the phase "PB" of the output signal of the first modulator 1003 and the initial value "PC" of the phase of the output signal of the second modulator 1005.

For example, it is assumed that the initial value "PC" of the phase of the second modulator is 0 degrees as shown in FIGS. 9 and 11. FIG. 13 is a diagram showing polar coordinates that show the phase "PB" of the output signal of the first modulator 1003 and the initial value "PC" of the phase of the output signal of the second modulator 1005.

As shown in FIG. 13, provided that the phase "PB"=2π/3, and the phase "PC"=0, a phase difference 1102 between a phase 1101 and 0 degrees occurs.

In this comparative example, the signal gathering circuit 1008 instantaneously switches from the phase in the first modulation scheme to the phase in the second modulation scheme.

Therefore, as shown in the example shown in FIG. 13, an instantaneous phase gap of 2π/3 occurs between the final phase 1101 in FSK and the start phase 0 in PSK. The instantaneous phase change causes a large number of frequency components in the transmission waveform, which is a violation of the radio transmission rules.

In view of such a problem of the comparative example, embodiments will be described in detail below.

Figure 14:
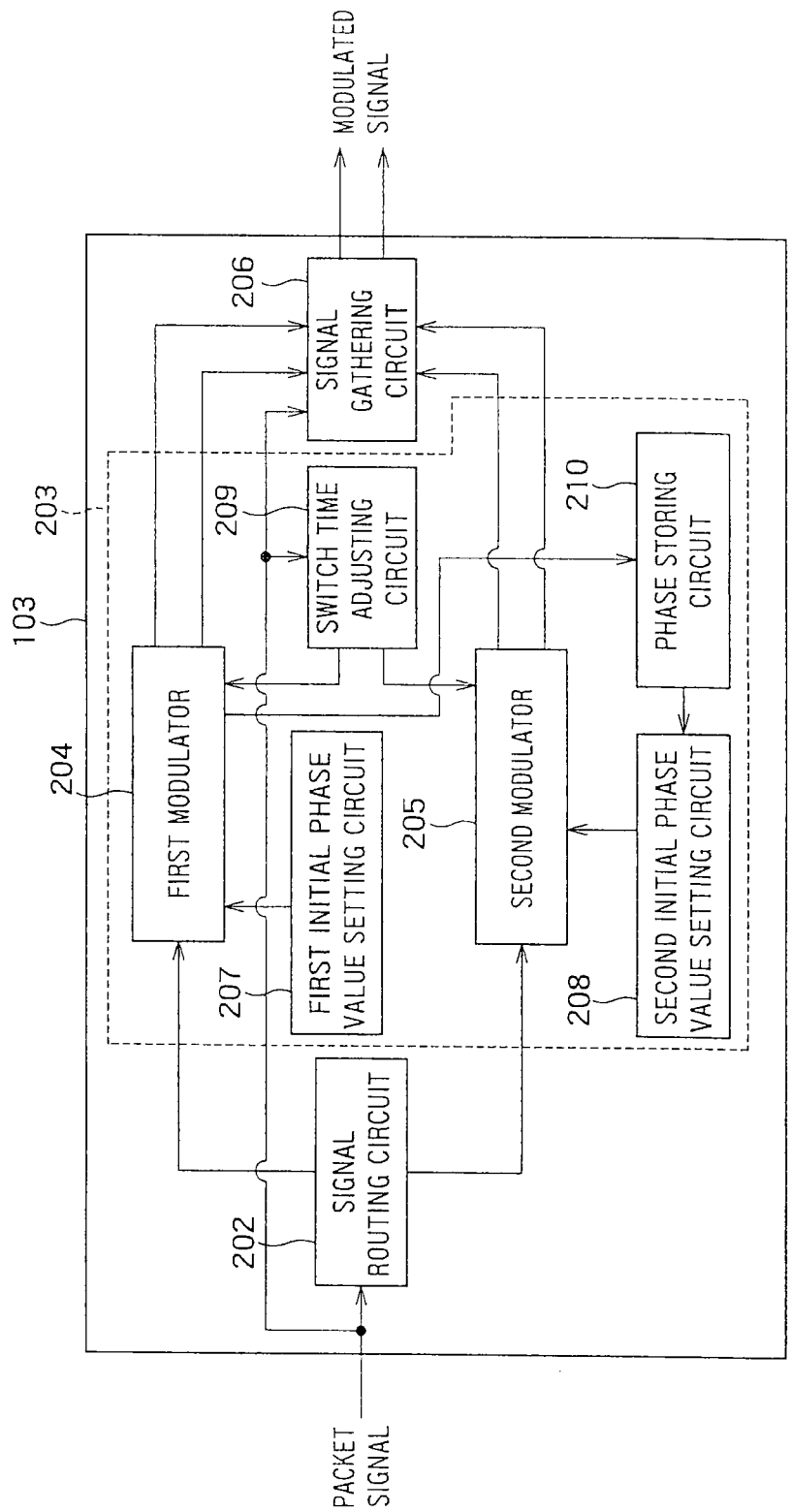
FIG. 14 is a block diagram showing another example of the configuration of the modulating circuit 103 according to the first embodiment that is incorporated in the radio transmitting apparatus 101 shown in FIG. 1.

FIG. 14 is a block diagram showing another example of the configuration of the modulating circuit 103 according to the first embodiment that is incorporated in the radio transmitting apparatus 101 shown in FIG. 1. In FIG. 14, the same reference numerals as those in FIG. 2 denote the same components as those in FIG. 2.

As shown in FIG. 14, the modulating circuit 103 includes the signal routing circuit 202, the modulation controlling circuit 203 and the signal gathering circuit 206.

The signal routing circuit 202 is configured to route the input packet signal to the first modulator 204 or the second modulator 205 based on the symbols of the input packet signal (or the number of bits of the symbols of the input packet signal).

For example, based on the symbols of the input packet signal (or the number of bits of the symbols of the preamble 301 (4 bits)), the signal routing circuit 202 routes the preamble 301, the packet header 302 and the guard section 303 of the packet signal 300 shown in FIG. 3 to the first modulator 204.

Then, based on the symbols of the input packet signal (or the number of bits of the symbols of the payload header 304 (8 bits)), the signal routing circuit 202 routes the payload header 304, the payload 305 and the CRC 306 of the packet signal 300 to the second modulator 205.

The modulation controlling circuit 203 includes the first modulator 204, the second modulator 205, a first initial phase value setting circuit 207, a second initial phase value setting circuit 208, a switch time adjusting circuit 209 and a phase storing circuit 210.

The first modulator 204 modulates the packet signal routed from the signal routing circuit 202 according to the first modulation scheme and outputs the resulting first modulated signal.

The second modulator 205 modulates the packet signal routed from the signal routing circuit 202 according to the second modulation scheme and outputs the resulting second modulated signal.

The first initial phase value setting circuit 207 sets the initial value "PA" of the phase of the first modulated signal, which is the value at the start of the modulation according to the first modulation scheme, in the first modulator 204.

The phase storing circuit 210 stores the phase "PB" of the first modulated signal at the end of the modulation of the packet signal by the first modulator 204 (the phase of the last symbol of the packet header).

The second initial phase value setting circuit 208 sets the phase stored in the phase storing circuit 210 in the second modulator 205 as the initial value "PC" of the phase of the second modulated signal, which is the value at the start of the modulation according to the second modulation scheme.

The switch time adjusting circuit 209 adjusts the time of switching from the modulation according to the first modulation scheme by the first modulator 204 to the modulation according to the second modulation scheme by the second modulator 205 based on the packet structure of the packet signal.

The signal gathering circuit 206 selects and outputs the first modulated signal output from the first modulator 204 and then selects and outputs the second modulated signal output from the second modulator 205 based on the packet structure of the packet signal.

The switch time adjusting circuit 209 keeps track of what part of the packet signal is being input and issues instructions to the first and second modulators 204 and 205 based on the part that is being input. This allows the first modulator 204 to stop modulation when the last symbol of the packet header 302, shown in FIG. 3, of the packet signal input to the first modulator 204 is reached, for example. The phase of the signal output form the first modulator 204 at this point is represented by "PB". In the period of the guard section 303 shown in FIG. 3, both the first modulator 204 and the second modulator 205 do not perform modulation.

Next, an example of an operation of the modulating circuit 103 of the radio transmitting apparatus 101 configured as described above will be described.

First, the packet signal is input from the packet generating circuit 102 to the modulating circuit 103.

Then, the signal routing circuit 202 inputs the leading edge of the packet signal to the first modulator 204, and modulation of the packet signal starts.

When the first initial phase value setting circuit 1204 sets the phase "PA" as an initial value in the first modulator 204, the phase changes from the phase "PA" according to the symbols of the packet signal. In this period, the signal gathering circuit 206 selects the output of the first modulator 204 and outputs the output of the first modulator 204 as the output of the modulating circuit 103.

When the last symbol of the packet header 302 of the packet signal 300 shown in FIG. 3 is input to the first modulator 204, the first modulator 204 stops the modulation. The phase storing circuit 210 stores the phase "PB", which is the phase of the signal from the first modulator 204 at the time when the modulation is stopped.

In the period of the guard section 303 shown in FIG. 3, both the first modulator 204 and the second modulator 205 do not perform the modulations.

This control is achieved by the switch time adjusting circuit 209 that keeps track of what part of the packet signal is being input and issues instructions to the modulators based on the part.

When the period of the guard section 303 expires, the signal routing circuit 202 starts inputting the packet symbols to the second modulator 205, and modulation according to the second modulation scheme starts. At this point, the second modulator 205 starts the modulation according to the second modulation scheme with the initial phase being the phase "PC" set in the second initial phase value setting circuit 208.

The second initial phase value setting circuit 208 sets the phase (initial value) "PC" to be equal to the phase "PB" stored in the phase storing circuit 210.

The signal gathering circuit 206 switches to select the data output from the second modulator 205 as the output of the modulating circuit 103.

The RF transmitting circuit 104 transmits the modulated signal output from the signal gathering circuit on a carrier (FIG. 1).

Figure 15:
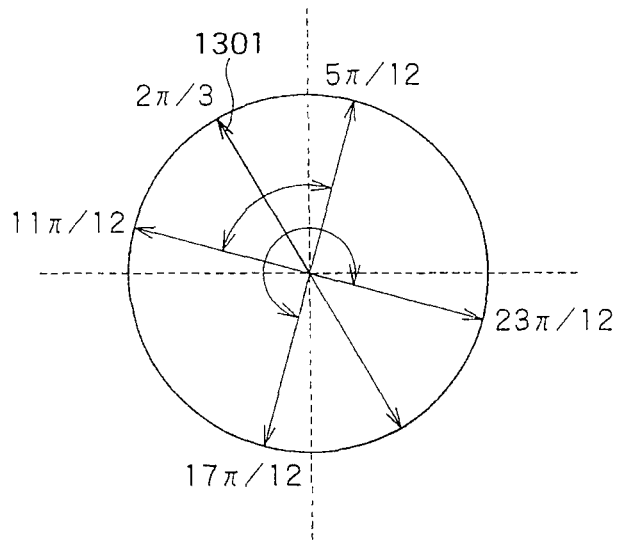
FIG. 15 is a diagram showing polar coordinates that show improvement of the phase gap in the case where the second modulation scheme is $\pi/4$ shift DQPSK.
Figure 16:
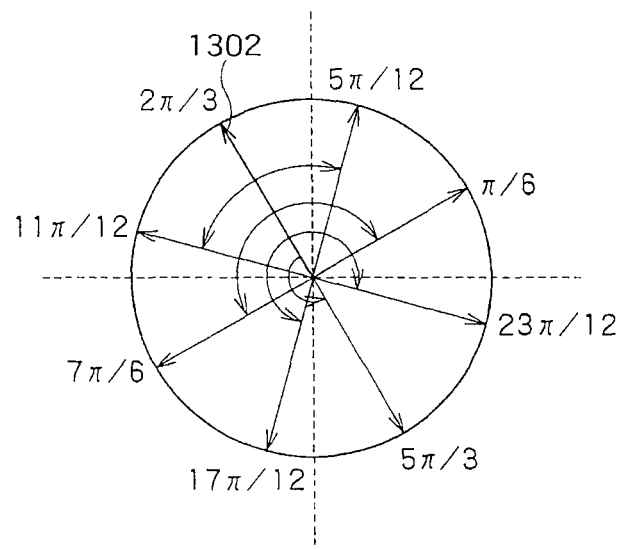
FIG. 16 is a diagram showing polar coordinates that show improvement of the phase gap in the case where the second modulation scheme is eight-value DPSK.

FIG. 15 is a diagram showing polar coordinates that show improvement of the phase gap in the case where the second modulation scheme is $\pi/4$ shift DQPSK. FIG. 16 is a diagram showing polar coordinates that show improvement of the phase gap in the case where the second modulation scheme is eight-value DPSK. In FIGS. 15 and 16, it is assumed that the final phase in FSK is $2\pi/3$ as in the case shown in FIG. 13 described above.

For example, in the case of $\pi/4$ shift DQPSK, the initial phase "PC" is not 0 described above with reference to FIGS. 9 and 10 but $2\pi/3$ set by the phase storing circuit 210 as shown in FIG. 15. As a result, the phase at the end of the next symbol is any of 5π/12, 11π/12, 17π/12 and 23π/12 that are spaced apart from 2π/3 by π/4, 3π/4, 5π/4 and 7π/4, respectively (FIG. 15).

In the case of eight-value DPSK, the initial phase "PC" is not 0 described above with reference to FIG. 11 but 2π/3 set by the phase storing circuit 210 as shown in FIG. 16.

As a result, the phase at the end of the next symbol is any of π/6, 5π/12, 2π/3, 11π/12, 7π/6, 17π/12, 5π/3 and 23π/12 that are spaced apart from 2π/3 by multiples of π/4 (FIG. 16).

In any case, the modulation is a differential modulation, so that the initial phase advantageously does not have to be 0.

In addition, since the modulations starts with the phase of 2π/3, no phase gap occurs, so that there is no concern about violation of the radio transmission rules.

As described above, the radio transmitting apparatus configured according to the first embodiment does not violate the radio transmission rules since initial phase of the second modulation is determined based on the information carried on from the first modulation scheme.

As described above, the radio transmitting apparatus according to the first embodiment can switch between modulation schemes while complying with the required rules.

(Second Embodiment)

In the first embodiment described above, as an example, a configuration in which the initial phase of the second modulation scheme is determined based on the information carried on from the first modulation scheme has been described.

In a second embodiment, as an example, a configuration will be described in which a part of the guard section is also modulated by the first modulator according to the first modulation scheme, and the phase difference between the final phase of the first modulator and the initial phase of the second modulator is close to 0 or π.

Figure 17:
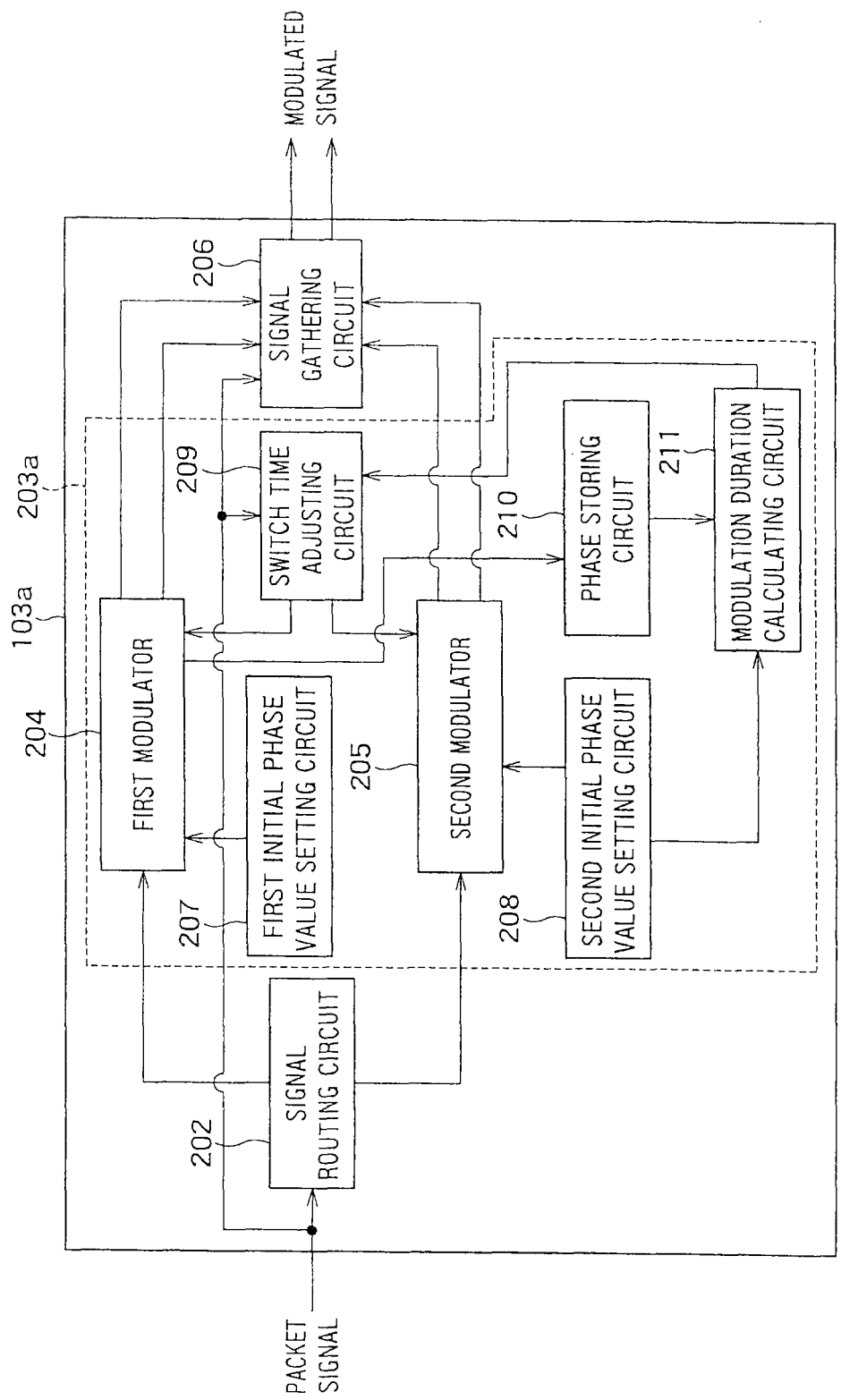
FIG. 17 is a block diagram showing an example of a configuration of a modulating circuit 103a according to the second embodiment that is incorporated in the radio transmitting apparatus 101 shown in FIG. 1.

FIG. 17 is a block diagram showing an example of a configuration of a modulating circuit 103a according to the second embodiment that is incorporated in the radio transmitting apparatus 101 shown in FIG. 1. In FIG. 17, the same reference numerals as those in FIG. 14 denote the same components as those in the first embodiment.

As shown in FIG. 17, the modulating circuit 103a includes the signal routing circuit 202, a modulation controlling circuit 203a and the signal gathering circuit 206. The modulating circuit 103a is incorporated in the radio transmitting apparatus 101 shown in FIG. 1 as with the modulating circuit 103 according to the first embodiment shown in FIG. 14.

The modulation controlling circuit 203a includes the first modulator 204, the second modulator 205, the first initial phase value setting circuit 207, the second initial phase value setting circuit 208, the switch time adjusting circuit 209, the phase storing circuit 210 and a modulation duration calculating circuit 211.

As can be seen, the modulating circuit 103a differs from the modulating circuit 103 according to the first embodiment in that the modulating circuit 103a further includes the modulation duration calculating circuit 211.

The second initial phase value setting circuit 208 sets, in the second modulator 205, the initial value "PC" of the phase of the second modulated signal, which is the value at the start of the modulation according to the second modulation scheme.

The switch time adjusting circuit 209 adjusts the time of switching from the modulation according to the first modulation scheme by the first modulator 204 to the modulation according to the second modulation scheme by the second modulator 205 based on the packet structure of the packet signal.

The modulation duration calculating circuit 211 is configured to calculate the duration of the modulation according to the first modulation scheme by the first modulator 204 based on the difference between the phase "PB" stored in the phase storing circuit 210 and the initial value "PC" set by the second initial phase value setting circuit 208, and set the calculated duration in the switch time adjusting circuit 209.

For example, the modulation duration calculating circuit 211 calculates the duration (extension) of the modulation according to the first modulation scheme by the first modulator 204 in such a manner that the difference between the phase "PB" stored in the phase storing circuit 210 and the initial value "PC" set by the second initial phase value setting circuit 208 is 0 or π.

The switch time adjusting circuit continues the modulation according to the first modulation scheme for the duration set by the modulation duration calculating circuit even after entering the guard section.

As a result, the difference between the phase "PB" stored in the phase storing circuit 210 and the initial value "PC" set by the second initial phase value setting circuit 208 is zero or π.

The remainder of the configuration and function of the modulating circuit 103a is the same as that of the modulating circuit 103 according to the first embodiment.

Next, an example of an operation of the modulating circuit 103a of the radio transmitting apparatus 101 configured as described above will be described.

First, the packet signal is input from the packet generating circuit 102 to the modulating circuit 103.

Then, the signal routing circuit 202 inputs the leading edge of the packet signal to the first modulator 204, and modulation of the packet signal starts.

Provided that the first initial phase value setting circuit 207 associated with the first modulator 204 sets the phase "PA", the phase changes from the phase "PA" in steps of "PD" per symbol as the symbols of the packet signal is input. In this period, the signal gathering circuit 206 selects the data output from the first modulator 204 and outputs the data as the output of the modulating circuit 103a.

Provided that the phase of the signal from the first modulator 204 at the time when the last symbol of the packet header 302, shown in FIG. 3, of the signal input to the first modulator 204 is reached is "PB", the first modulator 204 stores the value of the "PB" in the first final phase value storing circuit 210.

The initial phase of the second modulator 205 is set by the second initial phase value setting circuit 208 and is represented by "PC".

The modulation duration calculating circuit 211 calculates the difference (PC−PB) between the phase "PB" retrieved from the first final phase value storing circuit 210 and the phase "PC" set by the second initial phase value setting circuit 208, thereby determining the phase difference between the initial phase of the second modulation scheme and the final phase of the first modulation scheme.

The modulation duration calculating circuit 211 determines which of the multiples of the phase change "PD" per symbol in FSK is the closest to the phase difference and determines the value of the multiplier K that provides the multiple. That is, the modulation duration calculating circuit 211 determines the value K in the following formula (3).

$$PC - PB \approx PD \times K \quad (3)$$

The modulation duration calculating circuit 211 sets the symbol value K determined according to the formula (3) in the switch time adjusting circuit 209. After the last symbol of the packet header 302, shown in FIG. 3, of the signal input to the first modulator 204 is reached, the first modulator 204 continues modulating the first K symbols of the guard section 303 as if the input symbols are '1'.

The switch time adjusting circuit 209 performs control so as to allow the first modulator 204 continues operating until the modulation of the first K symbols of the guard section 303 is completed. On the (K+1)-th symbol of the guard section 303 is reached, the switch time adjusting circuit 209 stops both the first modulator 204 and the second modulator 205.

When the period of the guard section 303 expires, the signal routing circuit 202 starts inputting the packet symbols to the second modulator 205, and modulation according to the second modulation scheme starts. At this point, the second modulator 205 starts the modulation with the initial phase being the phase set by the second initial phase value setting circuit 208. The signal gathering circuit 206 switches to select the output from the second modulator 205 as the output of the modulating circuit 103.

Figure 18:
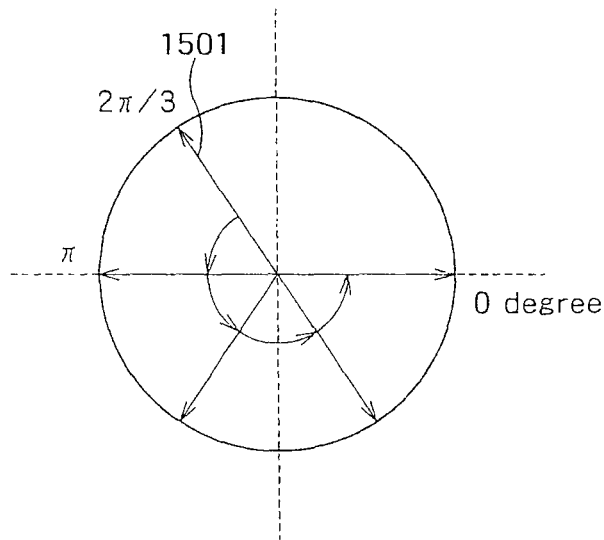
FIG. 18 is a diagram showing an example of polar coordinates in which the phase "0" occurs after 4 symbols of the guard section.
Figure 19:
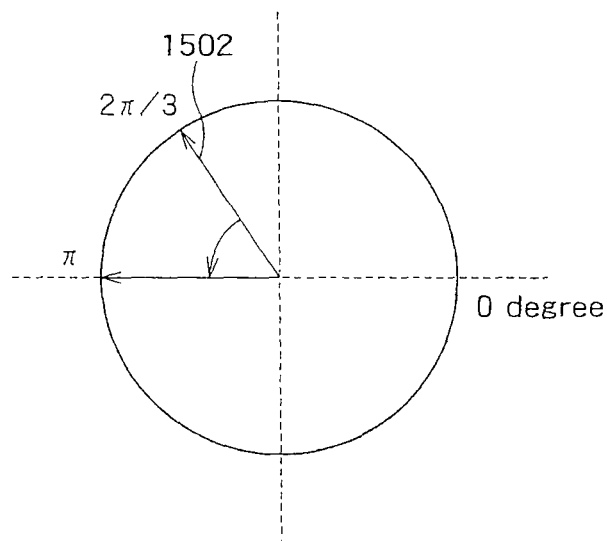
FIG. 19 is a diagram showing an example of polar coordinates in which the phase "$\pi$" occurs after one symbol of the guard section.

In the following, specific examples will be described. FIG. 18 is a diagram showing an example of polar coordinates in which the phase "0" occurs after 4 symbols of the guard section. FIG. 19 is a diagram showing an example of polar coordinates in which the phase "π" occurs after one symbol of the guard section.

In FIGS. 18 and 19, it is assumed that the phase change per symbol in FSK is π/3, as in FIG. 13.

It is assumed that the phase value for the first modulator 204 is 2π/3 when the last symbol of the header 302 of the packet signal 300 shown in FIG. 3 is input. In addition, it is assumed that the initial phase set in the second modulator 205 by the second initial phase value setting circuit 208 is 0.

Based on the fact that "0" and "2 π" are equivalent, the following formula (4) can be derived from the formula (3).

$$2\pi - 2\pi/3 = 4\pi/3 = \pi/3 \times K \quad (4)$$

According to the formula (4), the symbol value K is "4". Thus, after the phase of 2π/3 is reached, four additional symbols of the packet signal are modulated in the positive direction according to the first modulation scheme. As a result, the phase changes from 2π/3 to π, to 4π/3, to 5π/3 and finally to 0 as the 4 symbols are modulated (FIG. 18). At this point, the second modulator 205 starts the modulation according to the second modulation scheme.

That is, the phase after switching of the modulation scheme is 0, which is the same as the phase before switching of the modulation scheme, so that no phase gap occurs.

If the value of the difference (PC−PB) is greater than π in the formula (3), the following formula (5) can be used because the value of the left side minus π is approximately equal to the phase change "PD" multiplied by the symbol value K.

$$PC-PB-\pi \approx PD \times K \quad (5)$$

According to the formula (5), the symbol value K is "1". Therefore, the first modulator 204 modulates one additional symbol in the positive direction according to the first modulation scheme, thereby shifting the phase from 2π/3 to π (FIG. 19).

In this case, the phase difference between the final phase in the modulation by the first modulator 204 according to the first modulation scheme and the initial phase in the modulation by the second modulator 205 according to the second modulation scheme is π. However, the phase difference π is a linear phase change. Therefore, a frequency component that violates the radio transmission rules is unlikely to occur.

As described above, according to the second embodiment, the first modulator 204 additionally modulates a part of the guard section 303 according to the first modulation scheme so that the phase difference between the final phase of the first modulator 204 and the initial phase of the second modulator 205 is close to 0 or π. As a result, transmission of a frequency component that violates the radio transmission rules can be prevented.

As described above, the radio transmitting apparatus according to the second embodiment can switch between modulation schemes while complying with the required rules, as in the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A radio transmitting apparatus that performs modulation of an input packet signal according to at least two modulation schemes, comprising:
    a signal routing circuit that routes the input packet signal;
    a first modulator that performs modulation of the packet signal routed from the signal routing circuit according to a first modulation scheme and outputs a resulting first modulated signal;
    a second modulator that performs modulation of the packet signal routed from the signal routing circuit according to a second modulation scheme and outputs a resulting second modulated signal;
    a first initial phase value setting circuit that sets, in the first modulator, an initial value of the phase of the first modulated signal, which is a value at the start of the modulation according to the first modulation scheme;
    a phase storing circuit that stores the phase of the first modulated signal at the end of the modulation of the packet signal by the first modulator;
    a second initial phase value setting circuit that sets, in the second modulator, the phase stored in the phase storing circuit as an initial value of the phase of the second modulated signal, which is a value at the start of the modulation according to the second modulation scheme; and
    a signal gathering circuit that selects and outputs the first modulated signal output from the first modulator and then selects and outputs the second modulated signal output from the second modulator,
    wherein the first modulation scheme is FSK (frequency shift keying), and
    wherein the second modulation scheme is DPSK (differential phase shift keying).

2. The radio transmitting apparatus according to claim 1, wherein the packet signal comprises a preamble, a packet header following the preamble, a guard section following the packet header, a payload header following the guard section, a payload following the payload header, and a CRC (cyclic redundancy check) following the payload, and
    the signal routing circuit routes the preamble, the packet header and the guard section of the packet signal to the first modulator, and
routes the payload header, the payload and the CRC of the packet signal to the second modulator.

3. The radio transmitting apparatus according to claim 2, wherein the signal routing circuit routes the packet signal to the first modulator or the second modulator based on a symbol of the input packet signal.

4. The radio transmitting apparatus according to claim 2, wherein the second modulation scheme is π/4 shift DQPSK (differential quadrature phase shift keying) or eight-value DPSK (differential phase shift keying).

5. The radio transmitting apparatus according to claim 2, further comprising:
a packet generating circuit that receives a transmission signal, generates the packet signal from the transmission signal and outputs the packet signal; and
an RF (radio frequency) transmitting circuit that transmits the modulated signal output from the signal gathering circuit on a carrier.

6. The radio transmitting apparatus according to claim 1, wherein the signal routing circuit routes the packet signal to the first modulator or the second modulator based on a symbol of the input packet signal.

7. The radio transmitting apparatus according to claim 1, wherein the second modulation scheme is π/4 shift DQPSK (differential quadrature phase shift keying) or eight-value DPSK (differential phase shift keying).

8. The radio transmitting apparatus according to claim 1, further comprising:
a packet generating circuit that receives a transmission signal, generates the packet signal from the transmission signal and outputs the packet signal; and
an RF (radio frequency) transmitting circuit that transmits the modulated signal output from the signal gathering circuit on a carrier.

9. A radio transmitting apparatus that performs modulation of an input packet signal according to at least two modulation schemes, comprising:
a signal routing circuit that routes the input packet signal;
a first modulator that performs modulation of the packet signal routed from the signal routing circuit according to a first modulation scheme and outputs a resulting first modulated signal;
a second modulator that performs modulation of the packet signal routed from the signal routing circuit according to a second modulation scheme and outputs a resulting second modulated signal;
a first initial phase value setting circuit that sets, in the first modulator, an initial value of the phase of the first modulated signal, which is a value at the start of the modulation according to the first modulation scheme;
a phase storing circuit that stores the phase of the first modulated signal at the end of the modulation of the packet signal by the first modulator;
a second initial phase value setting circuit that sets, in the second modulator, an initial value of the phase of the second modulated signal, the initial value being a value at the start of the modulation according to the second modulation scheme;
a switch time adjusting circuit that adjusts a time of switching from the modulation by the first modulator according to the first modulation scheme to the modulation by the second modulator according to the second modulation scheme;
a modulation duration calculating circuit that calculates the duration of the modulation by the first modulator according to the first modulation scheme based on the difference between the phase stored in the phase storing circuit and the initial value set by the second initial phase value setting circuit and sets the duration in the switch time adjusting circuit; and
a signal gathering circuit that selects and outputs the first modulated signal output from the first modulator and then selects and outputs the second modulated signal output from the second modulator.

10. The radio transmitting apparatus according to claim 9, wherein the packet signal comprises a preamble, a packet header following the preamble, a guard section following the packet header, a payload header following the guard section, a payload following the payload header, and a CRC (cyclic redundancy check) following the payload, and
the signal routing circuit
routes the preamble, the packet header and the guard section of the packet signal to the first modulator, and
routes the payload header, the payload and the CRC of the packet signal to the second modulator.

11. The radio transmitting apparatus according to claim 10, wherein the modulation duration calculating circuit
calculates the duration of the modulation by the first modulator according to the first modulation scheme so that the difference is zero or π, and
the switch time adjusting circuit
continues the modulation according to the first modulation for the duration set by the modulation duration calculating circuit even after entering the guard section.

12. The radio transmitting apparatus according to claim 11, wherein the signal routing circuit routes the packet signal to the first modulator or the second modulator based on a symbol of the input packet signal.

13. The radio transmitting apparatus according to claim 10, wherein the signal routing circuit routes the packet signal to the first modulator or the second modulator based on a symbol of the input packet signal.

14. The radio transmitting apparatus according to claim 9, wherein the modulation duration calculating circuit
calculates the duration of the modulation by the first modulator according to the first modulation scheme so that the difference is zero or π, and
the switch time adjusting circuit
continues the modulation according to the first modulation for the duration set by the modulation duration calculating circuit even after entering the guard section.

15. The radio transmitting apparatus according to claim 9, wherein the signal routing circuit routes the packet signal to the first modulator or the second modulator based on a symbol of the input packet signal.

16. The radio transmitting apparatus according to claim 9, wherein the first modulation scheme is FSK (frequency shift keying).

17. The radio transmitting apparatus according to claim 9, wherein the second modulation scheme is π/4 shift DQPSK (differential quadrature phase shift keying) or eight-value DPSK (differential phase shift keying).

18. The radio transmitting apparatus according to claim 9, further comprising:
a packet generating circuit that receives a transmission signal, generates the packet signal from the transmission signal and outputs the packet signal; and
an RF (radio frequency) transmitting circuit that transmits the modulated signal output from the signal gathering circuit on a carrier.

* * * * *